3,022,145
SEPARATION OF METAL SALTS FROM AQUEOUS SOLUTIONS

Herbert Zima, Darmstadt, Germany, assignor to Rohm & Haas G.m.b.H., Darmstadt, Germany
No Drawing. Filed Oct. 15, 1956, Ser. No. 615,754
Claims priority, application Germany Oct. 24, 1955
6 Claims. (Cl. 23—309)

This invention relates to a method of extracting metal salts from aqueous solutions thereof.

Methods for binding dissolved compounds adsorptively on solid materials such as activated charcoal and silica gel and methods for extracting electrolytes from aqueous solutions with the assistance of so-called ion exchange resins are well known. In contradistinction to these methods, the results obtained in accordance with the method of the invention indicate that it involves extraction of metal salts from aqueous solutions by binding the salts chemically to a solid substance and does not depend for operability on incidental adsorption or on anion or cation exchange.

In accordance with the method of the present invention, the salts of certain metals are extracted from aqueous solutions by contact with polymeric hydrocyanic acid. The mechanism of the binding action between the metal salt and the polymeric hydrocyanic acid appears to be chemical in nature. The large quantities of metal salts which polymeric hydrocyanic acid is capable of binding and the fact that the bound salt, e.g., gold chloride and lead acetate, cannot be washed out of salt-enriched polymeric hydrocyanic acid indicate that the binding action is not of an adsorptive type.

The polymeric hydrocyanic acids that are suitable for the purposes of the invention include the various brown to black, apparently amorphous products to which hydrocyanic acid polymerizes under the influence of basically acting substances. The preparation of such products is, for example, described in German Patent 662,338 and U.S. Patent 2,069,543. The method and the particular catalysts employed in the polymerization of hydrocyanic acid are not critical in so far as the effectiveness of the polymer is concerned. The ability of polymeric hydrocyanic acid to bind the salts in practicable concentrations is retained when the polymer is saponified. In this case the described binding action of the polymer may be supplemented by a true ion exchange type of action.

The method of the invention is particularly applicable to the extraction, from solution, of the salts of metals whose standard electrode potential relative to the electrode potential of hydrogen, as listed in "Lehrbuch der Physikalischen Chemie" by John Eggert, (1941), page 545, is more positive than —0.4 volt. Examples of metals that meet these requirements and are capable of being bound are the noble metals such as platinum, palladium, gold and silver as well as others such as copper, mercury and lead. The extractability of the salts of this class of metals with polymeric hydrocyanic acid depends, to a minor but measurable degree, on the nature of the anion. To illustrate, the extractability of chlorides is somewhat greater than that of the corresponding sulfates.

The belief that the binding action of polymeric hydrocyanic acid in the method of the invention is a chemical reaction rather than an adsorptive binding is supported by the fact that the rapidity with which the binding action takes place and the quantity of metal salts that can be bound are both increased by increasing the temperature of operation. While the method is entirely effective and, because of the relatively large quantities of water involved, is preferably carried out at ambient temperatures, its effectiveness can be multiplied considerably by use of elevated temperatures up to the boiling point. Thus, for example, more than a seven-fold increase is obtainable by elevating the temperature of operation from 20 to 85° C. This will be demonstrated in the examples that follow.

The method of this invention has the advantage of making possible the extraction of the named metal salts from aqueous solutions whose concentrations are extremely low. It is useful for recovering metals and for removing traces of unwanted metal salts from aqueous solutions. The isolation of the metal salts bound to the polymeric hydrocyanic acid and their recovery as metals or metal salts can be achieved in a simple and known manner. Thus, for example, metallic gold or silver sulfate can readily be isolated by washing the "loaded" polymeric hydrocyanic acid with dilute acids or by heating and evaporating with concentrated sulfuric acid.

The described method is suitable not only for separating the named metal salts from salts of metals whose standard electrode potential is more negative than —0.4 but also, in a modification, for extracting one or more of the named metal salts preferentially and binding it or them to a polymeric hydrocyanic acid and thus isolating them. Thus, for example, a silver salt (silver having a standard potential of +0.81 volt) would be preferentially extracted from a solution containing it and a cobalt salt (cobalt having a standard potential of —0.268 volt).

The advantages and utility of the invention will become further apparent from the detailed description in the following examples illustrating the preferred modes now contemplated of carrying out the invention.

*Example 1*

A vessel was charged, at room temperature or about 20° C., with 50 grams polymeric hydrocyanic acid prepared by polymerization of HCN in aqueous solution in the manner described in Example 1 of U.S. Patent 2,069,543 and German Patent 662,338, calcium hydroxide however being used as catalyst, and with ten liters of a 1% aqueous solution of chlorauric acid ($AuCl_3 \cdot HCl$) containing 0.58% or 58 grams of gold. The polymeric hydrocyanic acid settling at the bottom of the vessel was distributed in the liquid by stirring at intervals.

After twenty-four hours the quantity of gold remaining in the solution was gravimetrically determined. After an additional forty-eight hours, the gold content was found to remain practically constant, thus leading to the conclusion that the amount precipitated and taken up by the polymeric hydrocyanic acid was the optimum at the operating temperature.

It was found that after twenty-four hours the gold content of the solution was reduced from the original 0.58% to 0.2585%. Thus 32.15 grams of the 58 grams of gold originally in the solution, or 55%, were taken up by 50 grams of polymeric hydrocyanic acid, i.e., 0.643 gram of gold, in the form of its salt, were bound by one gram of polymeric hydrocyanic acid, and thereby removed from the solution, under the described conditions.

*Example 2*

Ten liters of a 4% silver nitrate solution (containing 2.53% Ag) were mixed, in the manner described in Example 1, with 500 grams polymeric hydrocyanic acid obtained as described in Example 1 of U.S. Patent 2,069,543. After twelve hours' agitation and separation of the solids, the presence of silver in the separated solution was qualitatively no longer detectable.

*Example 3*

50 grams of polymeric hydrocyanic acid were mixed in the above-described manner with ten liters of lead acetate solution containing 2.072% lead. After twelve hours, the lead content of the solution was reduced to 1.87%. 50 grams of polymeric hydrocyanic acid therefore took up 20.2 grams of lead in the form of the acetate.

*Example 4*

50 grams of polymeric hydrocyanic acid were mixed as before with ten liters of a chloro platinic acid

($H_2PtCl_6$)

solution having a platinum content of 0.148% by weight. After twelve hours, the platinum content of the solution was reduced to 0.078%. The polymeric hydrocyanic acid therefore removed 7.0 grams of platinum in the form of the salt.

*Example 5*

To determine the influence of temperature on the accumulation of the metal salt, two tests were carried out side by side. In each test, 10.19 grams of polymeric HCN were stirred into ten liters of a solution of chlorauric acid containing 0.1788% or 17.88 grams of gold. One mixture was held at 20° C. and a second at 85° C. After thirty minutes, the solutions were separated from the polymeric hydrocyanic acid.

It was found that at 20° C. the polymeric hydrocyanic acid had taken up 1.0802 grams of gold in the form of the salt and that at 85° C. this amount was increased to 7.9074 grams.

In a third test, 10.56 grams of polymeric hydrocyanic acid, upon being mixed with ten liters of a chlorauric acid solution containing 17.88 grams of gold and maintained at 80° C. for two hours, removed 13.8654 grams of gold from the solution.

*Example 6*

In the course of three hours, five liters of a chlorauric acid solution containing $300 \times 10^{-6}$ grams gold per liter were passed, at room temperature, through a column of polymeric hydrocyanic acid having a length of 20 cm. and a diameter of 2 cm.

It was found that after passage through this column, the gold content of the solution was reduced to $60 \times 10^{-6}$ grams gold per liter, the polymeric HCN having taken up 80% of the original gold content of the solution.

*Example 7*

1000 liters of water having dissolved therein 20 mg. of gold in the form of chlorauric acid, was passed, in a test run of ten days and at room temperature, through an 8 mm. diameter glass tube containing 7.5 grams of polymeric hydrocyanic acid in the form of tablets having a diameter of 5 mm. and a thickness of 2 mm. The tablets were prepared by mixing 100 grams of the polymeric hydrocyanic acid with 20 grams of a 50% methacrylate emulsion, drying the mixture in a vacuum and pressing the powdery product to the tablet form in a conventional press at 50–60° C.

The molded tablets of polymeric hydrocyanic acid swelled readily but were so resistant to erosion that their shape had not been altered appreciably after being subjected to the stream of water for ten days. At the end of the test, the tablets were dried and evaporated with sulfuric acid. Microelectrolytic analysis showed that the 7.5 grams of polymeric hydrocyanic acid contained 7.5 mg. of gold, i.e., approximately 37% of the initial gold content was separated in the course of ten days from the gold-containing water.

*Example 8*

One kg. of polymeric HCN obtained by the method of Example 1 in U.S. Patent 2,069,543 and having a nitrogen content of between 42 and 46% was treated for two hours with two kg. of a 30% solution of caustic soda at boiling temperature. The brown-black polymer dissolved with evolution of ammonia. The solution was acidified with dilute sulfuric acid to precipitate a flocculent, brown product, which was separated by filtration and washed well. The partially saponified polymeric HCN thus obtained was found to have a nitrogen content of approximately 28%.

The procedure of Example 2 was repeated, 500 grams of the saponified HCN polymer being substituted for the polymer of that example. It was found that after twelve hours at 20° C. the silver content of the solution had been reduced from 2.53% to 0.08%, the saponified polymer having taken up 0.49 gram silver per gram of polymer.

*Example 9*

50 grams of the saponified HCN polymer prepared by the method of Example 8 were stirred into ten liters of a chloro platinic acid solution containing 0.158% or 15.8 grams of platinum. After twenty-four hours at 20° C., the platinum content of the solution was reduced to 0.122% by weight, 3.6 grams of platinum having been taken up by the 50 grams of saponified HCN polymer.

It is to be expected that numerous modifications will readily become apparent to those skilled in the art upon reading this description. All such modifications are intended to be included within the scope of the invention as defined in the appended claims.

I claim:

1. Method for extracting a salt of a metal having a standard electrode potential, relative to the electrode potential of hydrogen, more positive than −0.4 volt from an aqueous solution thereof, which process comprises bringing the solution into contact with a solid, brown to black, amorphous polymeric hydrocyanic acid prepared by the polymerization of hydrocyanic acid under the influence of a basic catalyst, whereby said metal salt is bound to said solid polymer, and then separating said solid polymer and metal salt bound thereto from the solution.

2. Method according to claim 1 wherein said solution and solid polymer are contacted at a temperature between about room temperature and about 85° C.

3. Method according to claim 1 wherein said solution and solid, brown to black, amorphous polymeric hydrocyanic acid are contacted by passing said solution through a column of said solid polymeric hydrocyanic acid.

4. Method as defined in claim 3 wherein the polymeric hydrocyanic acid is in pelletized form.

5. Method for extracting a salt of a metal having a standard electrode potential, relative to the electrode potential of hydrogen, more positive than −0.4 volt from an aqueous solution thereof, which process comprises bringing the solution into contact with a solid, flocculent, brown saponified product of a solid, brown to black, amorphous, polymeric hydrocyanic acid prepared by the polymerization of hydrocyanic acid under the influence of a basic catalyst, whereby said metal salt is bound to said solid saponified product, and then separating said solid saponified product and metal salt bound thereto from the solution.

6. Method for preferentially extracting, from an aqueous solution having salts of different metals dissolved therein, a salt of the metal having the most positive standard electrode potential, relative to the electrode potential of hydrogen, greater than −0.4 volt, which process comprises bringing said solution into contact with a solid, brown to black, amorphous polymeric hydrocyanic acid prepared by the polymerization of hydrocyanic acid under the influence of a basic catalyst, whereby said metal salt having the most positive standard electrode potential is bound to said solid polymer, and then separating said solid polymer and metal salt bound thereto from the solution.

References Cited in the file of this patent

UNITED STATES PATENTS

| | | |
|---|---|---|
| 2,069,543 | Adams | Feb. 2, 1937 |
| 2,729,557 | Booth et al. | Jan. 3, 1956 |

OTHER REFERENCES

Thorpe's Dictionary of Applied Chemistry, J. F. Thorpe and M. A. Whiteley, 4th ed., Vol. III, page 502, Longmans, Green and Co. N.Y. (1939).